(12) United States Patent
Romano

(10) Patent No.: US 9,698,588 B2
(45) Date of Patent: Jul. 4, 2017

(54) UNIVERSAL BUSHING

(71) Applicant: Pedro Rivera Romano, Mexico City (MX)

(72) Inventor: Pedro Rivera Romano, Mexico City (MX)

(73) Assignee: Cooper Technology Company, Houston, TX (US)

( * ) Notice: Subject to any disclaimer, the term of this patent is extended or adjusted under 35 U.S.C. 154(b) by 1098 days.

(21) Appl. No.: 13/887,154

(22) Filed: May 3, 2013

(65) Prior Publication Data

US 2014/0326498 A1    Nov. 6, 2014

(51) Int. Cl.
| | |
|---|---|
| *H02G 15/013* | (2006.01) |
| *H02G 15/22* | (2006.01) |
| *H02G 15/26* | (2006.01) |
| *H02G 3/22* | (2006.01) |
| *H02G 3/08* | (2006.01) |

(Continued)

(52) U.S. Cl.
CPC .......... *H02G 15/013* (2013.01); *H02G 3/083* (2013.01); *H02G 3/088* (2013.01); *H02G 3/22* (2013.01); *H02G 15/22* (2013.01); *H02G 15/26* (2013.01); *H01B 17/26* (2013.01); *H01B 17/28* (2013.01); *H01B 17/303* (2013.01); *H01B 17/306* (2013.01); *H01B 17/34* (2013.01); *H02G 3/065* (2013.01); *H02G 3/0675* (2013.01); *H02G 3/0683* (2013.01); *H02G 3/0691* (2013.01)

(58) Field of Classification Search
CPC .......... H02G 3/22; H02G 3/065; H02G 3/083; H02G 3/088; H02G 3/0616; H02G 3/0675; H02G 3/0691; H02G 3/0683; H02G 15/013; H02G 15/13; H02G 15/22; H02G 15/26; B60R 16/0222; H01B 17/14; H01B 17/26; H01B 17/28; H01B 17/34; H01B 17/303; H01B 17/306
See application file for complete search history.

(56) References Cited

U.S. PATENT DOCUMENTS

| | | |
|---|---|---|
| 1,953,124 A | 4/1934 | Oldberg |
| RE19,195 E | 6/1934 | Hadley |
| | (Continued) | |

OTHER PUBLICATIONS

Econ Abrasives, Product Sheet for Nested Reducer Bushing, downloaded at https://www.econabrasives.com/products.php?id=219&cat=114, 1 page.

*Primary Examiner* — Ishwarbhai B Patel
*Assistant Examiner* — Paresh Paghadal
(74) *Attorney, Agent, or Firm* — King & Spalding LLP

(57) ABSTRACT

A universal bushing is described herein. The universal bushing can include a base member and a first bushing member. The base member can include at least one outer portion and at least one inner wall that forms a first cavity, where the at least one inner wall has a perimeter that is substantially uniform along a first height of the at least one inner wall. The first bushing member can be removeably coupled to the base member and disposed within the first cavity, where the first bushing member includes at least one first wall having a first inner surface that forms a second cavity and a first outer surface, where the at least one first wall has a first inner perimeter that is substantially uniform along a second height of the at least one first wall, and where the first outer surface forms a first outer perimeter.

19 Claims, 7 Drawing Sheets

(51) Int. Cl.
*H02G 3/06* (2006.01)
*H01B 17/34* (2006.01)
*H01B 17/28* (2006.01)
*H01B 17/30* (2006.01)
*H01B 17/26* (2006.01)

(56) References Cited

U.S. PATENT DOCUMENTS

| | | | |
|---|---|---|---|
| 1,974,813 A | 9/1934 | Grawoig | |
| 2,030,053 A | 2/1936 | Channell | |
| 2,076,223 A | 4/1937 | Channell | |
| 2,085,907 A | 7/1937 | Gray | |
| 2,183,296 A | 12/1939 | Marx | |
| 4,289,319 A | 9/1981 | Hold et al. | |
| 4,525,000 A * | 6/1985 | Bachle | H02G 3/0675 174/653 |
| 6,268,565 B1 * | 7/2001 | Daoud | G02B 6/4471 174/657 |
| 7,406,777 B2 | 8/2008 | Grover et al. | |
| 7,749,021 B2 * | 7/2010 | Brodeur | H01R 13/59 174/359 |
| 2005/0262682 A1 * | 12/2005 | Grover | B23P 9/025 29/428 |

* cited by examiner excellent# UNIVERSAL BUSHING

TECHNICAL FIELD

The present disclosure relates generally to bushings, and more particularly to systems, methods, and devices for a universal bushing that can be used with a number of cable sizes at different times.

BACKGROUND

Bushings for cables are used to provide a liquid-tight seal around the outer surface of the cable. Bushings are often made of an elastomeric material and can be used as part of an electrical connector. In such a case, when the electrical connector is assembled and tightened, the bushing is compressed against the outer surface of the cable. The cable passes through a cavity formed by the bushing. If the cavity is not of sufficient size relative to the size of the cable, then either the cable cannot pass through the cavity or the bushing cannot form a proper seal around the outer surface of the cable.

SUMMARY

In general, in one aspect, the disclosure relates to a universal bushing. The universal bushing can include a base member having at least one outer portion and at least one inner wall that forms a first cavity, where the at least one inner wall has a perimeter that is substantially uniform along a first height of the at least one inner wall. The universal bushing can also include a first bushing member removeably coupled to the base member and disposed within the first cavity, where the first bushing member can include at least one first wall having a first inner surface that forms a second cavity and a first outer surface, where the at least one first wall has a first inner perimeter that is substantially uniform along a second height of the at least one first wall, and where the first outer surface forms a first outer perimeter. The first inner perimeter can be less than the perimeter and the first outer perimeter. The first outer perimeter can be slightly less than the perimeter. The first bushing member, once decoupled from the base member, can be recoupled to the base member. The base member and the first bushing member can be made of an elastomeric material.

In another aspect, the disclosure can generally relate to an electrical connector. The electrical connector can include a housing having a receiving area and a passage that traverses the receiving area, the top, and the bottom. The electrical connector can also include a universal bushing positioned within the receiving area. The universal bushing can include a base member having at least one outer portion and at least one inner wall that forms a first cavity, where the at least one inner wall has a perimeter that is substantially uniform along a first height of the at least one inner wall. The universal bushing can also include a first bushing member removeably coupled to the base member and disposed within the first cavity, where the first bushing member can include at least one first wall having a first inner surface that forms a second cavity and a first outer surface, where the at least one first wall has a first inner perimeter that is substantially uniform along a second height of the at least one first wall, and where the first outer surface forms a first outer perimeter. The first inner perimeter can be less than the perimeter and the first outer perimeter. The first outer perimeter can be slightly less than the perimeter. The first bushing member, once decoupled from the base member, can be recoupled to the base member. The base member and the first bushing member can be made of an elastomeric material.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION

Figure 1A:
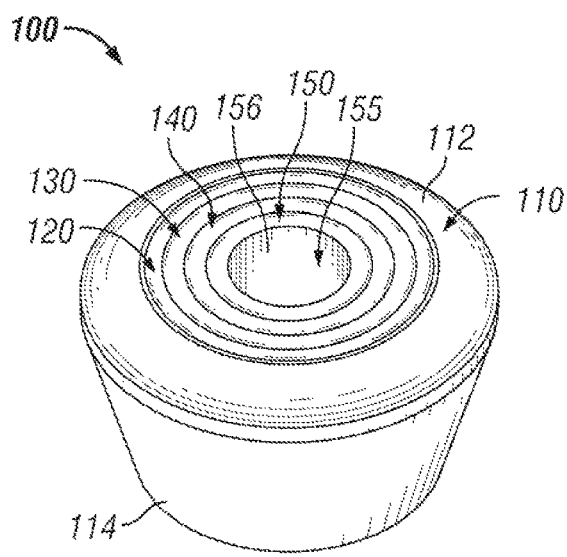
FIGS. 1A and 1B show various views of an example universal bushing in accordance with certain example embodiments.

In general, example embodiments provide systems, methods, and devices for a universal bushing. Like, but not necessarily the same or identical, elements in the various figures are denoted by like reference numerals for consistency. In the following detailed description of the example embodiments, numerous specific details are set forth in order to provide a more thorough understanding of the disclosure herein. However, it will be apparent to one of ordinary skill in the art that the example embodiments herein may be practiced without these specific details. In other instances, well-known features have not been described in detail to avoid unnecessarily complicating the description. As used herein, a length, a width, and height can each generally be described as lateral directions. Also, any numerical listing (e.g., first, second) of any components described herein are merely meant as distinguishing descriptions among such components and are not meant to indicate a priority or other specific order. Further, any orientation (e.g., top, bottom) of an example universal bushing and/or of one or more of its components can be altered from what is described herein.

The example universal bushings described herein allow one or more cables (e.g. conductors, wires, cords) to pass therethrough. When one or more compressive forces is applied to the universal bushing, the universal bushing can provide a seal around the cable. The seal formed by the universal bushing around the cable prevents or reduces fluids from passing through the universal bushing along the conductor.

In certain example embodiments, one or more components of the universal bushings described herein can be made of a flexible elastomeric material. Examples of such flexible elastomeric material can include, but are not limited to, synthetic rubbers produced by polymerization of chloroprene, such as neoprene, polychloroprene, urethane, and silicone. In addition, or in the alternative, the flexible elastomeric material can include a butyl compound.

The various portions of an example universal bushing (e.g., base member, a bushing member) can be made as a single piece (e.g., made from a single mold) or as multiple pieces that are mechanically coupled together. In the latter case, the multiple pieces can be mechanically coupled using one or more of a number of methods, including but not limited to epoxy, melting, fusion, a fastening device, and a clamping device.

A user may be any person that interacts with an example universal bushing. Examples of a user may include, but are not limited to, an engineer, an electrician, an instrumentation and controls technician, a mechanic, an operator, a consultant, a contractor, and a manufacturer's representative. As used herein, a perimeter can be used to describe a measurement around a circular surface or object. Alternatively, a perimeter can be used generically as a term to describe a measurement around a non-circular (e.g., rectangular, square, oval, octagonal) surface or object.

Example embodiments of universal bushings will be described more fully hereinafter with reference to the accompanying drawings, in which example embodiments of universal bushings are shown. Universal bushings may, however, be embodied in many different forms and should not be construed as limited to the example embodiments set forth herein. Rather, these example embodiments are provided so that this disclosure will be thorough and complete, and will fully convey the scope of universal bushings to those of ordinary skill in the art. Like, but not necessarily the same, elements (also sometimes called components) in the various figures are denoted by like reference numerals for consistency.

Figure 1B:
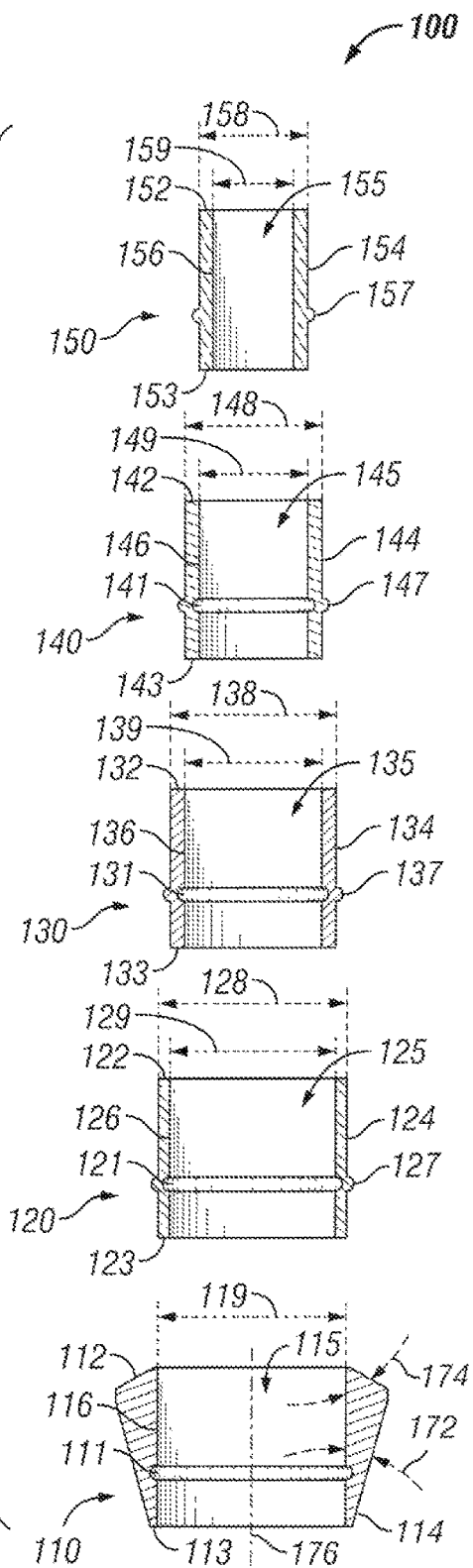

FIGS. 1A and 1B show various views of an example universal bushing 100 in accordance with certain example embodiments. Specifically, FIG. 1A shows a perspective view of the universal bushing 100, and FIG. 1B shows a cross-sectional side exploded view of the universal bushing 100. In one or more embodiments, one or more of the components or elements shown in FIGS. 1A and 1B may be omitted, repeated, and/or substituted. Accordingly, embodiments of a universal bushing should not be considered limited to the specific configuration shown in FIGS. 1A and 1B.

Referring to FIGS. 1A and 1B, the universal bushing 100 includes a base member 110 and one or more of a number of bushing members, described below. In certain example embodiments, the base member 110 includes (depending on the cross-sectional shape of the cavity 115) at least one inner wall 116 that forms a cavity 115 that passes through the entire height of the base member 110. The inner wall 116 can have a perimeter that is substantially uniform along the height of the inner wall 116. The inner wall 116 can be smooth, textured, and/or have any of a number of other features. The cavity 115 formed by the inner wall 116, when viewed cross-sectionally, can have any of a number of shapes, including but not limited to circular, oval, square, octagonal, and rectangular.

One or more portions of the inner wall 116 can include one or more of a number of features to couple a bushing member (e.g., bushing member 120) to the base member 110. For example, as shown in FIG. 1B, the base member 110 can include a recess 111 that is disposed on a portion of the inner wall 116. The recess 111 of the base member 110 can be used to receive, for example, a protrusion 127 disposed on a portion of an outer surface 124 of the wall of a bushing member 120. In such a case, when the bushing member 120 is inserted into the cavity 115 formed by the inner wall 116, the protrusion 127 can be positioned within (fit into) the recess 111 when the protrusion 127 aligns with the recess 111. The recess 111 can be disposed on all or a portion of the perimeter of the inner wall 116.

In certain example embodiments, the base member 110 is conical in shape. For example, as shown in FIGS. 1A and 1B, the base member 110 can have a top side 112 that is tapered and a bottom side 114 that is also tapered. The top side 112 and the bottom side 114 can be tapered differently from each other so that the top side 112 and the bottom side 114 are not symmetrical with respect to each other. Alternatively, the top side 112 and the bottom side 114 can be tapered substantially the same so that the top side 112 and the bottom side 114 are substantially symmetrical with respect to each other. The top side 112 and the bottom side 114 can be tapered so that each can receive a compressive force, as shown below with respect to FIGS. 4A and 4B. The shape and/or size of the side (top side 112, bottom side 114) of the base member 110 can vary to match the shape and/or size of the components of a device (e.g., a housing of an electrical connector) into which the base member 110 can be positioned.

The top side 112 can be tapered at some angle 174 relative to a lateral axis 176 that extends through the cavity 115 of the base member 110. In certain example embodiments, the angle 174 at which the top side 112 is tapered relative to the lateral axis 176 is less than or equal to 90°. For example, the angle 174 can be greater than 45° and less than or equal to 90°. Alternatively, the angle 174 can be equal to or less than 45°. Similarly, the bottom side 114 can be tapered at some angle 172 relative to the lateral axis 176 that extends through the cavity 115 of the base member 110. In certain example embodiments, the angle 172 at which the bottom side 114 is tapered relative to the lateral axis 176 is less than or equal to 90°. For example, the angle 174 can be less than 45°. Alternatively, the angle 172 can be equal to or greater than 45° and less than or equal to 90°.

The angle 172 can be the same or a different angle than the angle 174. For example, the angle 172 and the angle 174 can each be 45°. In certain example embodiments, the top side 112 and the bottom side 114 is a flat surface. Alternatively, the top side 112 and/or the bottom side 114 of the base member 110 can be curved (convex, concave), sawtoothed-shaped, randomly-shaped, and/or have any other contour and/or shape. Collectively, the top side 112 and the bottom side 114 of the base member 110 can be part of an outer portion of the base member 110.

In certain example embodiments, the universal bushing 100 includes one or more bushing members. For example, in this case, there are four bushing members (bushing member 120, bushing member 130, bushing member 140, and bushing member 150). A universal bushing 100 can have fewer bushing members (but at least one bushing member) or more bushing members. Bushing member 120 can be removeably coupled to the base member 110. Specifically, the bushing member 120 can be disposed inside of the cavity 115 of the base member 110.

The bushing member 120 can include at least one wall. The wall can have an inner surface 126 and an outer surface 124. The inner surface 126 forms a cavity 125 that traverses the entire height of the bushing member 120. There can be more than one wall of the bushing member 120, depending on the cross-sectional shape of the cavity 125. The inner surface 126 can have an inner perimeter that is substantially uniform along the height of the wall of the bushing member 120. The inner surface 126 can be smooth, textured, and/or have any of a number of other features. The cavity 125 formed by the inner surface 126, when viewed cross-sectionally, can have any of a number of shapes, including but not limited to circular, oval, square, octagonal, and rectangular. When the inner surface 126 is circular, the inner surface 126 can have a diameter 129, as shown in FIG. 1B. The inner perimeter of the inner surface 126 can be less than the perimeter of the inner wall 116 of the base member 110.

Further, the outer surface 124 can have an outer perimeter that is substantially uniform along the height of the wall of the bushing member 120. The outer surface 124 can be smooth, textured, and/or have any of a number of other features. The outer perimeter formed by the outer surface 124, when viewed cross-sectionally, can have any of a number of shapes, including but not limited to circular, oval, square, octagonal, and rectangular. Such shape can be substantially the same as the shape of the perimeter of the inner wall 116 of the base member 110. When the outer surface 124 is circular, the outer surface 124 can have a diameter 128, as shown in FIG. 1B. As can be seen, the diameter 128 of the outer surface 124 is greater than the diameter 129 of the inner surface 126 of the bushing member 120.

The outer perimeter of the outer surface 124 can be less than or substantially the same as the perimeter of the inner wall 116 of the base member 110. In some cases, when the outer perimeter of the outer surface 124 is substantially the same as the perimeter of the inner wall 116, some amount of force may be required to couple the bushing member 120 to the base member 110. The shape of the outer perimeter of the bushing member 120 can be the same or different than the shape of the inner perimeter of the bushing member 120.

The height of the bushing member 120 can be substantially similar to the height of the base member 110. In such a case, the top side 122 of the bushing member 120 can be substantially flush with the top side of the base member 110 when the bushing member 120 is mechanically coupled to the base member 110. Also, in such a case, the bottom side 123 of the bushing member 120 can be substantially flush with the bottom side of the base member 110 when the bushing member 120 is mechanically coupled to the base member 110. Alternatively, the height of the bushing member 120 can be different (longer, shorter) than the height of the base member 110.

In certain example embodiments, the outer surface 124 of the bushing member 120 includes one or more of a number of features to couple the bushing member 120 to the base member 110. For example, as shown in FIG. 1B and discussed above, the bushing member 120 can include a protrusion 127 disposed on a portion of an outer surface 124 of the wall of the bushing member 120. The protrusion 127 can correspond with the recess 111 disposed on a portion of the inner wall 116 of the base member 110. The recess 111 of the base member 110 can be used to receive the protrusion 127. In such a case, when the bushing member 120 is inserted into the cavity 115 formed by the inner wall 116, the protrusion 127 can be positioned within (fit into) the recess 111 when the protrusion 127 aligns with the recess 111. The protrusion 127 can be disposed on all or a portion of the outer surface 124.

This arrangement of the protrusion 127 of the bushing member 120 and the recess 111 of the base member 110 (or other types of arrangements, such as described below with respect to FIGS. 2A and 2B) can allow the bushing member 120 to be decoupled and recoupled to the base member 110 any of a number of times. The ability to remove or add bushing members in such a way allows the example universal bushing to receive a number of different sized cables at a number of different times, rather than discarding the bushing if a smaller size cable is subsequently used.

In addition, or in the alternative, one or more portions of the inner surface 126 of the bushing member 120 can include one or more of a number of features to couple the bushing member 120 to another bushing member (e.g., bushing member 130). For example, as shown in FIG. 1B, bushing member 120 can include a recess 121 that is disposed on a portion of the inner surface 126. The recess 121 of the bushing member 120 can be used to receive, for example, a protrusion 137 disposed on a portion of an outer surface 134 of the wall of bushing member 130. In such a case, when the bushing member 130 is inserted into the cavity 125 formed by the inner surface 126 of the bushing member 120, the protrusion 137 can be positioned within (fit into) the recess 121 when the protrusion 137 aligns with the recess 121. The recess 121 can be disposed on all or a portion of the perimeter of the inner surface 126.

Like bushing member 120, bushing member 130 can include at least one wall. The wall can have an inner surface 136 and an outer surface 134. The inner surface 136 forms a cavity 135 that traverses the entire height of the bushing member 130. There can be more than one wall of the bushing member 130, depending on the cross-sectional shape of the cavity 135. The inner surface 136 can have an inner perimeter that is substantially uniform along the height of the wall of the bushing member 130. The inner surface 136 can be smooth, textured, and/or have any of a number of other features. The cavity 135 formed by the inner surface 136, when viewed cross-sectionally, can have any of a number of shapes, including but not limited to circular, oval, square, octagonal, and rectangular. When the inner surface 136 is circular, the inner surface 136 can have a diameter 139, as shown in FIG. 1B. The inner perimeter of the inner surface 136 can be less than the perimeter of the inner surface 126 of the bushing member 120.

Further, the outer surface 134 can have an outer perimeter that is substantially uniform along the height of the wall of the bushing member 130. The outer surface 134 can be smooth, textured, and/or have any of a number of other features. The outer perimeter formed by the outer surface 134, when viewed cross-sectionally, can have any of a number of shapes, including but not limited to circular, oval, square, octagonal, and rectangular. Such shape can be substantially the same as the shape of the perimeter of the inner surface 126 of the bushing member 120. When the outer surface 134 is circular, the outer surface 134 can have a diameter 138, as shown in FIG. 1B. As can be seen, the diameter 138 of the outer surface 134 is greater than the diameter 139 of the inner surface 136 of the bushing member 130.

The outer perimeter of the outer surface 134 can be less than or substantially the same as the perimeter of the inner surface 126 of the bushing member 120. In some cases, when the outer perimeter of the outer surface 134 is substantially the same as the perimeter of the inner surface 126, some amount of force may be required to couple the bushing member 130 to the bushing member 120. The shape of the outer perimeter of the bushing member 130 can be the same or different than the shape of the inner perimeter of the bushing member 130.

The height of the bushing member 130 can be substantially similar to the height of the bushing member 120 and/or the height of the base member 110. In such a case, the top side 132 of the bushing member 130 can be substantially flush with the top side 122 of the bushing member 120 and/or the top side of the base member 110 when the bushing member 130 is mechanically coupled to the bushing member 120. Also, in such a case, the bottom side 133 of the bushing member 130 can be substantially flush with the bottom side 123 of the bushing member 120 and/or the bottom side of the base member 110 when the bushing member 130 is mechanically coupled to the bushing member 120. Alternatively, the height of the bushing member 130 can be different (longer, shorter) than the height of the bushing member 120 and/or the height of the base member 110.

In certain example embodiments, the outer surface 134 of the bushing member 130 includes one or more of a number of features to couple the bushing member 130 to the bushing member 120. For example, as shown in FIG. 1B and similar to the bushing member 120, the bushing member 130 can include a protrusion 137 disposed on a portion of an outer surface 134 of the wall of bushing member 130. The protrusion 137 can correspond with the recess 121 disposed on a portion of the inner surface 126 of the bushing member 120. The recess 121 of the bushing member 120 can be used to receive the protrusion 137. In such a case, when the bushing member 130 is inserted into the cavity 125 formed by the inner surface 126, the protrusion 137 can be positioned within (fit into) the recess 121 when the protrusion 137 aligns with the recess 121. The protrusion 137 can be disposed on all or a portion of the outer surface 134.

In such a case, the nesting of the bushing members must occur in a particular order. For example, because the outer perimeter of the outer surface 134 of the bushing member 130 is less than the outer perimeter of the outer surface 124 of the bushing member 120, the bushing member 130, when inserted into the cavity 115 formed by the inner wall 116 of the base member 110 without the bushing member 120 being coupled to the base member 110, is too small to mechanically couple to the base member 110.

In addition, or in the alternative, one or more portions of the inner surface 136 of the bushing member 130 can include one or more of a number of features to couple the bushing member 130 to another bushing member (e.g., bushing member 140). For example, as shown in FIG. 1B, bushing member 130 can include a recess 131 that is disposed on a portion of the inner surface 136. The recess 131 of the bushing member 130 can be used to receive, for example, a protrusion 147 disposed on a portion of an outer surface 144 of the wall of bushing member 140. In such a case, when the bushing member 140 is inserted into the cavity 135 formed by the inner surface 136 of the bushing member 130, the protrusion 147 can be positioned within (fit into) the recess 131 when the protrusion 147 aligns with the recess 131. The recess 131 can be disposed on all or a portion of the perimeter of the inner surface 136.

Similarly, bushing member 140 can include at least one wall. The wall can have an inner surface 146 and an outer surface 144. The inner surface 146 forms a cavity 145 that traverses the entire height of the bushing member 140. There can be more than one wall of the bushing member 140, depending on the cross-sectional shape of the cavity 145. The inner surface 146 can have an inner perimeter that is substantially uniform along the height of the wall of the bushing member 140. The inner surface 146 can be smooth, textured, and/or have any of a number of other features. The cavity 145 formed by the inner surface 146, when viewed cross-sectionally, can have any of a number of shapes, including but not limited to circular, oval, square, octagonal, and rectangular. When the inner surface 146 is circular, the inner surface 146 can have a diameter 149, as shown in FIG. 1B. The inner perimeter of the inner surface 146 can be less than the perimeter of the inner surface 146 of the bushing member 140.

Further, the outer surface 144 can have an outer perimeter that is substantially uniform along the height of the wall of the bushing member 140. The outer surface 144 can be smooth, textured, and/or have any of a number of other features. The outer perimeter formed by the outer surface 144, when viewed cross-sectionally, can have any of a number of shapes, including but not limited to circular, oval, square, octagonal, and rectangular. Such shape can be substantially the same as the shape of the perimeter of the inner surface 136 of the bushing member 130. When the outer surface 144 is circular, the outer surface 144 can have a diameter 148, as shown in FIG. 1B. As can be seen, the diameter 148 of the outer surface 144 is greater than the diameter 149 of the inner surface 146 of the bushing member 140.

The outer perimeter of the outer surface 144 can be less than or substantially the same as the inner perimeter of the inner surface 136 of the bushing member 130. In some cases, when the outer perimeter of the outer surface 144 is substantially the same as the perimeter of the inner surface 136, some amount of force may be required to couple the bushing member 140 to the bushing member 130. The shape of the outer perimeter of the bushing member 140 can be the same or different than the shape of the inner perimeter of the bushing member 140.

The height of the bushing member 140 can be substantially similar to the height of bushing member 130, the height of bushing member 120 and/or the height of the base member 110. In such a case, the top side 142 of the bushing member 140 can be substantially flush with the top side 132 of the bushing member 130, the top side 122 of the busying member 120, and/or the top side of the base member 110 when the bushing member 140 is mechanically coupled to the bushing member 130. Also, in such a case, the bottom side 143 of the bushing member 140 can be substantially flush with the bottom side 133 of the bushing member 130, the bottom side 123 of the bushing member 120, and/or the bottom side of the base member 110 when the bushing member 140 is mechanically coupled to the bushing member 130. Alternatively, the height of the bushing member 140 can be different (longer, shorter) than the height of the bushing member 130, the height of the bushing member 120, and/or the height of the base member 110.

In certain example embodiments, the outer surface 144 of the bushing member 140 includes one or more of a number of features to couple the bushing member 140 to the bushing member 130. For example, as shown in FIG. 1B and similar to bushing member 120 and bushing member 130, the bushing member 140 can include a protrusion 147 disposed on a portion of an outer surface 144 of the wall of bushing member 140. The protrusion 147 can correspond with the recess 131 disposed on a portion of the inner surface 136 of the bushing member 130. The recess 131 of the bushing member 130 can be used to receive the protrusion 147. In such a case, when the bushing member 140 is inserted into the cavity 135 formed by the inner surface 136, the protrusion 147 can be positioned within (fit into) the recess 131 when the protrusion 147 aligns with the recess 131. The protrusion 147 can be disposed on all or a portion of the outer surface 144.

Again, in such a case, the nesting of the bushing members must occur in a particular order. For example, because the outer perimeter of the outer surface 144 of the bushing member 140 is less than the outer perimeter of the outer surface 134 of the bushing member 130, the bushing member 140, when inserted into the cavity 115 formed by the inner wall 116 of the base member 110 without the bushing member 120 being coupled to the base member 110 and without the bushing member 130 being coupled to the bushing member 120, is too small to mechanically couple to the base member 110.

In addition, or in the alternative, one or more portions of the inner surface 146 of the bushing member 140 can include one or more of a number of features to couple the bushing member 140 to another bushing member (e.g., bushing member 150). For example, as shown in FIG. 1B, bushing member 140 can include a recess 141 that is disposed on a portion of the inner surface 146. The recess 141 of the bushing member 140 can be used to receive, for example, a protrusion 157 disposed on a portion of an outer surface 154 of the wall of bushing member 150. In such a case, when the bushing member 150 is inserted into the cavity 145 formed by the inner surface 146 of the bushing member 140, the protrusion 157 can be positioned within (fit into) the recess 141 when the protrusion 157 aligns with the recess 141. The recess 141 can be disposed on all or a portion of the perimeter of the inner surface 146.

Similarly, bushing member 150 can include at least one wall. The wall can have an inner surface 156 and an outer surface 154. The inner surface 156 forms a cavity 155 that traverses the entire height of the bushing member 150. There can be more than one wall of the bushing member 150, depending on the cross-sectional shape of the cavity 155. The inner surface 156 can have an inner perimeter that is substantially uniform along the height of the wall of the bushing member 150. The inner surface 156 can be smooth, textured, and/or have any of a number of other features. The cavity 155 formed by the inner surface 156, when viewed cross-sectionally, can have any of a number of shapes, including but not limited to circular, oval, square, octagonal, and rectangular. When the inner surface 156 is circular, the inner surface 156 can have a diameter 159, as shown in FIG. 1B. The inner perimeter of the inner surface 156 can be less than the perimeter of the inner surface 156 of the bushing member 150.

Further, the outer surface 154 can have an outer perimeter that is substantially uniform along the height of the wall of the bushing member 150. The outer surface 154 can be smooth, textured, and/or have any of a number of other features. The outer perimeter formed by the outer surface 154, when viewed cross-sectionally, can have any of a number of shapes, including but not limited to circular, oval, square, octagonal, and rectangular. Such shape can be substantially the same as the shape of the perimeter of the inner surface 146 of the bushing member 140. When the outer surface 154 is circular, the outer surface 154 can have a diameter 158, as shown in FIG. 1B. As can be seen, the diameter 158 of the outer surface 154 is greater than the diameter 159 of the inner surface 156 of the bushing member 150.

The outer perimeter of the outer surface 154 can be less than or substantially the same as the inner perimeter of the inner surface 146 of the bushing member 140. In some cases, when the outer perimeter of the outer surface 154 is substantially the same as the perimeter of the inner surface 146, some amount of force may be required to couple the bushing member 150 to the bushing member 140. The shape of the outer perimeter of the bushing member 150 can be the same or different than the shape of the inner perimeter of the bushing member 150.

The height of the bushing member 150 can be substantially similar to the height of busing member 140, the height of bushing member 130, the height of bushing member 120, and/or the height of the base member 110. In such a case, the top side 152 of the bushing member 150 can be substantially flush with the top side 142 of the bushing member 140, the top side 132 of the bushing member 130, the top side 122 of the busying member 120, and/or the top side of the base member 110 when the bushing member 150 is mechanically coupled to the bushing member 140. Also, in such a case, the bottom side 153 of the bushing member 150 can be substantially flush with the bottom side 143 of the bushing member 140, the bottom side 133 of the bushing member 130, the bottom side 123 of the bushing member 120, and/or the bottom side of the base member 110 when the bushing member 150 is mechanically coupled to the bushing member 140. Alternatively, the height of the bushing member 150 can be different (longer, shorter) than the height of the bushing member 140, the height of the bushing member 130, the height of the bushing member 120, and/or the height of the base member 110.

In certain example embodiments, the outer surface 154 of the bushing member 150 includes one or more of a number of features to couple the bushing member 150 to the bushing member 140. For example, as shown in FIG. 1B and similar to bushing member 120, bushing member 130, and bushing member 140, the bushing member 150 can include a protrusion 157 disposed on a portion of an outer surface 154 of the wall of bushing member 150. The protrusion 157 can correspond with the recess 141 disposed on a portion of the inner surface 146 of the bushing member 140. The recess 141 of the bushing member 140 can be used to receive the protrusion 157. In such a case, when the bushing member 150 is inserted into the cavity 145 formed by the inner surface 146, the protrusion 157 can be positioned within (fit into) the recess 141 when the protrusion 157 aligns with the recess 141. The protrusion 157 can be disposed on all or a portion of the outer surface 154.

Again, in such a case, the nesting of the bushing members must occur in a particular order. For example, because the outer perimeter of the outer surface 154 of the bushing member 150 is less than the outer perimeter of the outer surface 144 of the bushing member 140, the bushing member 150, when inserted into the cavity 115 formed by the inner wall 116 of the base member 110 without the bushing member 120 being coupled to the base member 110 and without the bushing member 130 being coupled to the bushing member 120 and without the bushing member 140 being coupled to the bushing member 130, is too small to mechanically couple to the base member 110.

In addition, or in the alternative, one or more portions of the inner surface 156 of the bushing member 150 can include one or more of a number of features to couple the bushing member 150 to another bushing member (not shown). For example, bushing member 150 can include a recess (not shown) that is disposed on a portion of the inner surface 156. The recess of the bushing member 150 can be used to receive, for example, a protrusion disposed on a portion of an outer surface of the wall of such other bushing member. In such a case, when the other bushing member is inserted into the cavity 155 formed by the inner surface 156 of the bushing member 150, the protrusion can be positioned within (fit into) the recess 151 when the protrusion aligns with the recess 151. The recess 151 can be disposed on all or a portion of the perimeter of the inner surface 156.

Example diameters (and/or other measurements) of the various components of a universal bushing can vary. For example, the inner diameter 119 of the base member 110 can be approximately 1.37 inches. As another example, the inner diameter 129 of the inner surface 126 of the bushing member 120 can be approximately 1.18 inches, while the outer diameter 128 of the outer surface 124 of the bushing member 120 can be approximately 1.37 inches. As yet another example, the inner diameter 139 of the inner surface 136 of the bushing member 130 can be approximately 0.99 inches, while the outer diameter 138 of the outer surface 134 of the bushing member 130 can be approximately 1.18 inches. As still another example, the inner diameter 149 of the inner surface 146 of the bushing member 140 can be approximately 0.80 inches, while the outer diameter 148 of the outer surface 144 of the bushing member 140 can be approximately 0.99 inches. As yet another example, the inner diameter 159 of the inner surface 156 of the bushing member 150 can be approximately 0.61 inches, while the outer diameter 158 of the outer surface 154 of the bushing member 150 can be approximately 0.80 inches.

Figure 2A:
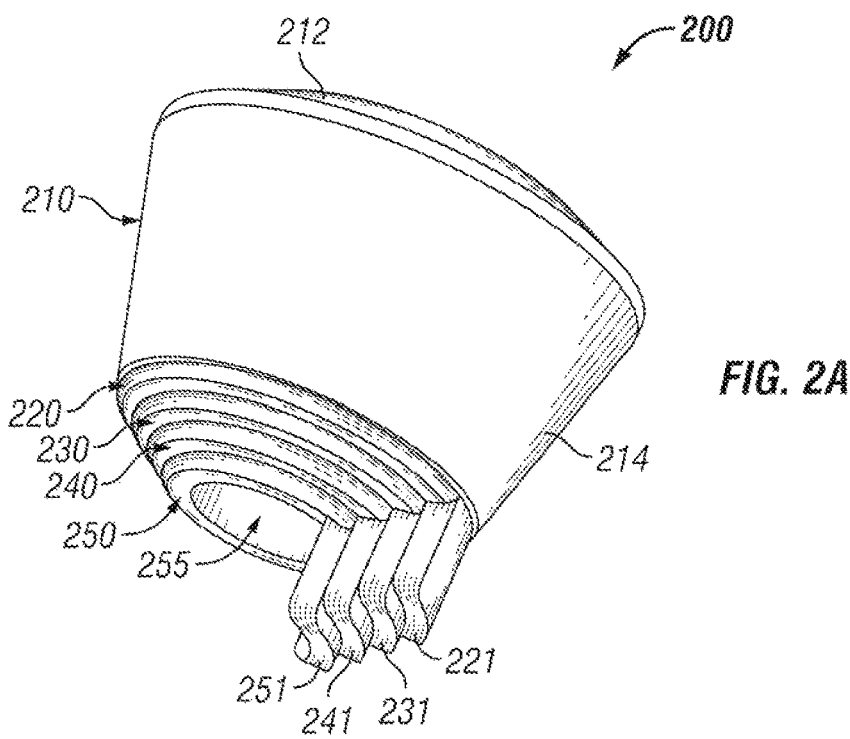
FIGS. 2A and 2B show various views of another example universal bushing in accordance with certain example embodiments.
Figure 2B:
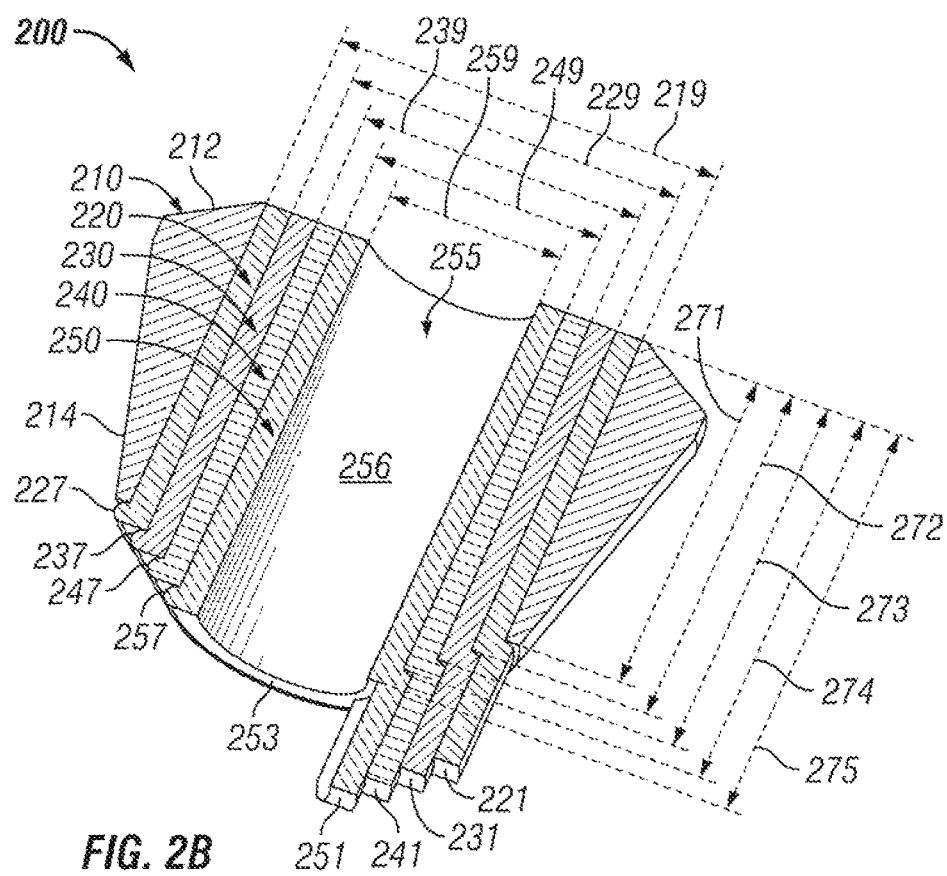

FIGS. 2A and 2B show various views of another example universal bushing 200 in accordance with certain example embodiments. Specifically, FIG. 2A shows a perspective view of the universal bushing 200, and FIG. 2B shows a cross-sectional side perspective view of the universal bushing 200. In one or more embodiments, one or more of the components or elements shown in FIGS. 2A and 2B may be omitted, repeated, and/or substituted. Accordingly, embodiments of a universal bushing should not be considered limited to the specific configuration shown in FIGS. 2A and 2B.

The universal bushing 200 can include a base member 210 and one or more bushing members (in this case, bushing member 220, bushing member 230, bushing member 240, and bushing member 250). The universal bushing 200 is substantially similar to the universal bushing 100 described above with respect to FIGS. 1A and 1B, with exceptions as described below. For example, the universal bushing 200 includes a base member 210 that is conically shaped, having a top portion 212 and a bottom portion 214, and has an inner wall that forms a circular cavity and has a diameter 219. The bushing member 220 is positioned inside the circular cavity of the base member 210 and has an inner surface that forms a circular cavity and has a diameter 229. The bushing member 230 is positioned inside the circular cavity of the bushing member 220 and has an inner surface that forms a circular cavity and has a diameter 239. The bushing member 240 is positioned inside the circular cavity of the bushing member 230 and has an inner surface that forms a circular cavity and has a diameter 249. The bushing member 250 is positioned inside the circular cavity of the bushing member 240 and has an inner surface 256 that forms a circular cavity 255 and has a diameter 259.

Referring now to FIGS. 1A through 2B, the universal bushing 200 includes different features that are used to couple components of the universal bushing 200 to each other. Specifically, rather than protrusions and recesses in one or more components of the universal bushing 100, as described above, one or more of the bushing members can include a collar and varying heights.

For example, as shown in FIGS. 2A and 2B, bushing member 220 can have a height 272 that is slightly larger than the height 271 of the base member 210. In certain example embodiments, the difference between the height 272 of the bushing member 220 and the height 271 of the base member 210 is substantially the height of the collar 227. The collar 227 can be positioned, configured, and/or oriented in one or more of a number of ways on the bushing member 220. For example, the collar 227 can be disposed on any portion of the bushing member 220, including but not limited to the bottom end of the bushing member 220 and the top end of the bushing member 220.

As another example, the collar 227 can extend radially outward from the wall and/or outer surface of the bushing member 220. In such a case, when the bushing member 220 is inserted into the cavity of, and coupled to, the base member 210, the collar 227 extends over at least a portion of a surface (e.g., the bottom side) of the base member 210, preventing the bushing member 220 from being pushed further into the cavity of the base member 210. In other words, the collar 227 helps to hold the bushing member 220 in a relatively fixed position relative to the base member 210.

Similarly, bushing member 230 can have a height 273 that is slightly larger than the height 272 of the bushing member 220. In certain example embodiments, the difference between the height 273 of the bushing member 230 and the height 272 of the bushing member 220 is substantially the height of the collar 237. Thus, the height 273 of the bushing member 230 is also greater than the height 271 of the base member 210. The collar 237 can be positioned, configured, and/or oriented on the bushing member 230 in a same or different way than the collar 227 is positioned, configured, and/or oriented on the bushing member 220. For example, as shown in FIGS. 2A and 2B, the collar 237 can be disposed on the bottom end of the bushing member 230, just as the collar 227 is disposed on the bottom end of the bushing member 220.

As another example, the collar 237 can extend radially outward from the wall and/or outer surface of the bushing member 230. In such a case, when the bushing member 230 is inserted into the cavity of, and coupled to, the bushing member 220, the collar 237 extends over at least a portion of a surface (e.g., the collar 227 on the bottom side) of the bushing member 220, preventing the bushing member 230 from being pushed further into the cavity of the bushing member 220. In other words, the collar 237 helps to hold the bushing member 230 in a relatively fixed position relative to the bushing member 220. The thickness of the collar 227 can be the same or different than the thickness of the collar 237.

In a similar fashion, the bushing member 240 can include a collar 247 disposed on a bottom end of the bushing member 240, and the bushing member 250 can include a collar 257 disposed on a bottom end 253 of the bushing member 250. In addition, or in the alternative, one or more bushing members can include a different coupling feature (e.g. recesses and/or protrusions) to mechanically couple two or more components of the universal bushing to each other. Such features can allow the components of the universal bushing to be coupled to each other in a nested fashion, where different components can be removed and/or added to adjust the size of the cavity through which a cable of a given size can be disposed.

In certain example embodiments, one or more of the bushing members of the universal bushing 200 include a handling feature (e.g. a tab) to assist a user in removing and/or adding a bushing member to the universal bushing 200. Such a handling feature can be positioned, sized, shaped, and/or oriented at any point on a respective bushing member. For example, as shown in FIGS. 2A and 2B, the handling feature 221 of the bushing member 220 can be a tab that extends laterally from the collar 227 in a plane (or in this case, an arc segment) substantially parallel to the wall of the bushing member 220.

Similarly, the bushing member 230 of FIGS. 2A and 2B includes a handling feature 231 in the form of a tab that extends laterally from the collar 237 in a plane (or in this case, an arc segment) substantially parallel to the wall of the bushing member 230. The handling feature 231 can be aligned with, offset from, or otherwise oriented with respect to the handling feature 221. The size and/or shape of the handling feature 231 can be the same or different than the size and/or shape of the handling feature 221. For example, in this case, the size (e.g., height, width) and shape (e.g., arc segment) of the handling feature 221 and the handling feature 231 in FIGS. 2A and 2B are substantially the same.

In a similar fashion, the bushing member 240 can include a handling feature 241, and the bushing member 250 can include a handling feature 251. The handling feature 241 and the handling feature 251 of FIGS. 2A and 2B are sized, shaped, positioned, and oriented in a manner substantially similar to the handling feature 221 and the handling feature 231. Specifically, the handling feature 241 is a tab that extends laterally from the collar 247 in an arc segment substantially parallel to the wall of the bushing member 240. Also, the handling feature 251 is a tab that extends laterally from the collar 257 in an arc segment substantially parallel to the wall of the bushing member 250.

Figure 3:
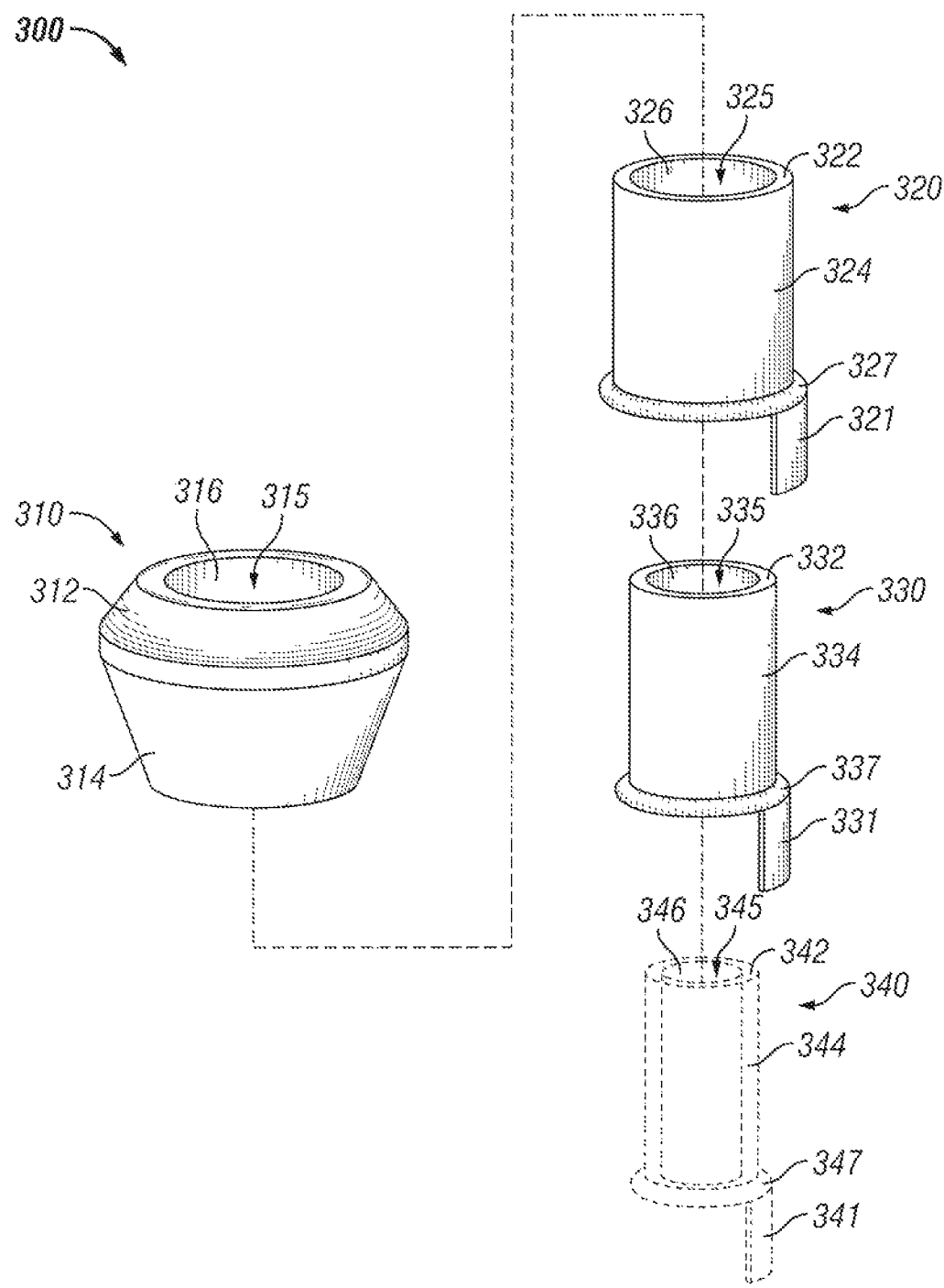
FIG. 3 shows an exploded view of still another example universal bushing in accordance with certain example embodiments.

FIG. 3 shows an exploded view of still another example universal bushing 300 in accordance with certain example embodiments. In one or more embodiments, one or more of the components or elements shown in FIG. 3 may be omitted, repeated, and/or substituted. Accordingly, embodiments of a universal bushing should not be considered limited to the specific configuration shown in FIG. 3.

Referring to FIGS. 1A-3, the universal bushing 300 of FIG. 3 is substantially similar to the universal bushing 200 of FIGS. 2A and 2B, except that, in addition to the body member 310, there are only three bushing members (bushing member 320, bushing member 330, bushing member 340) instead of four bushing members. The universal bushing 300 can have only three bushing members, so that the universal bushing 300 is not able to effectively create a liquid-tight seal around cables below a certain outer perimeter (also called a cable perimeter). Alternatively, the universal bushing 300 can have additional bushing members that have been removed (but that can be recoupled to the universal bushing 300) and are not shown.

The features of the base member 310 of the universal bushing 300 are substantially the same as the features of the base member 210 of the universal bushing 200 and the base member 110 of the universal bushing 100. Specifically, the base member 310 includes a tapered top side 314, a tapered bottom side 312, and an inner wall 316 that forms a cavity 315. Similarly, the features of the bushing members of the universal bushing 300 are substantially the same as the features of the bushing members of the universal bushing 200. Specifically, the bushing member 320 includes a wall with an inner surface 326 that forms a cavity 325, an outer surface 324, a collar 327 on the bottom end (opposite the top end 322), and a handling feature 321 that extends laterally from the collar 327. Similarly, the bushing member 330 includes a wall with an inner surface 336 that forms a cavity 335, an outer surface 334, a collar 337 on the bottom end (opposite the top end 332), and a handling feature 331 that extends laterally from the collar 337. Finally, the bushing member 340 includes a wall with an inner surface 346 that forms a cavity 345, an outer surface 344, a collar 347 on the bottom end (opposite the top end 342), and a handling feature 341 that extends laterally from the collar 347.

Figure 4A:
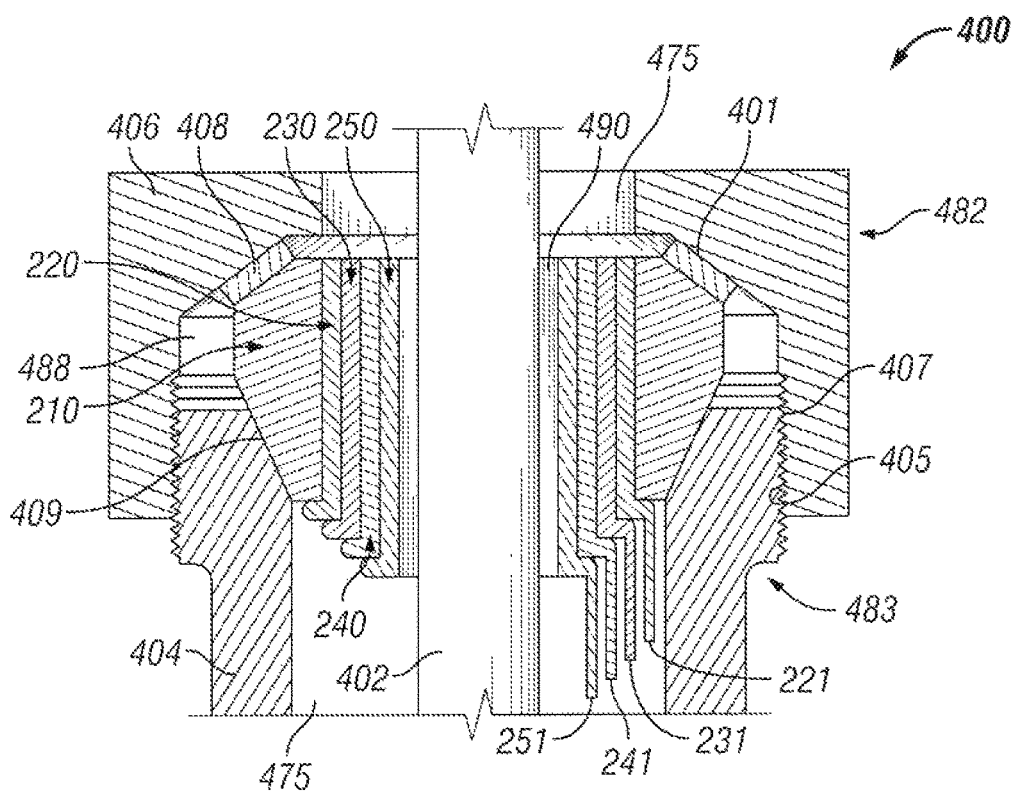
FIGS. 4A and 4B show various views of a portion of an electrical connector that includes the example universal bushing of FIGS. 2A and 2B in accordance with certain example embodiments.
Figure 4B:
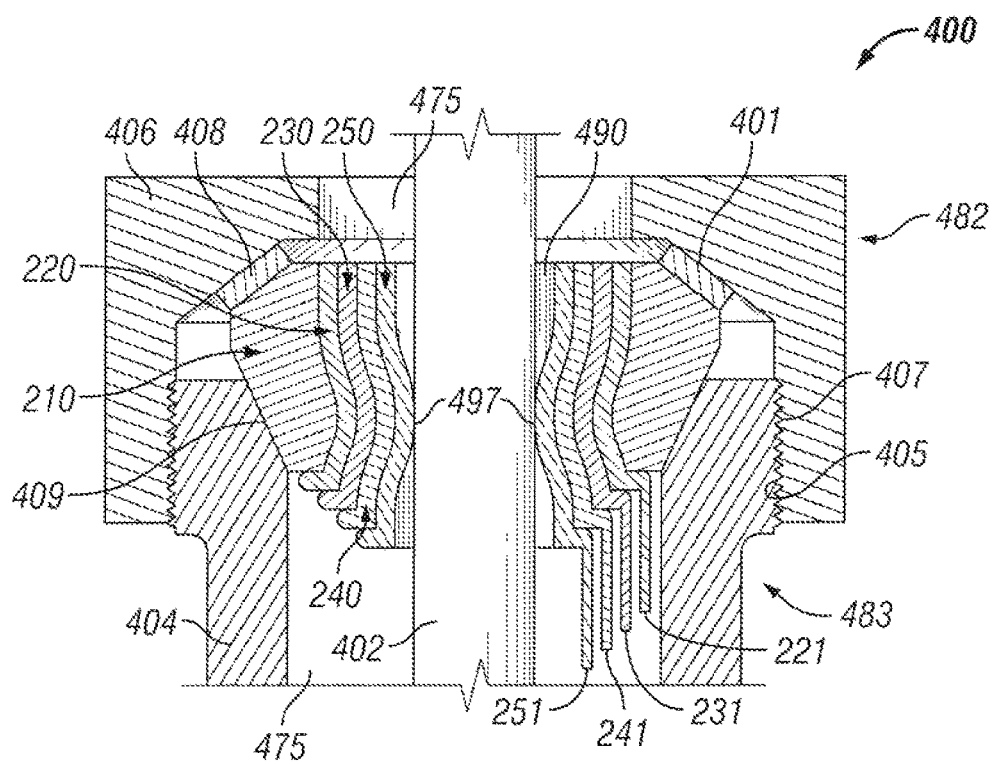

FIGS. 4A and 4B show various views of a portion of an electrical connector 400 (also called, for example, an electrical plug) that includes the example universal bushing 200 of FIGS. 2A and 2B in accordance with certain example embodiments. Specifically, FIG. 4A shows a cross-sectional side view of the electrical connector 400 before being tightened into a fully-closed position. FIG. 4B shows a cross-sectional side view of the electrical connector 400 in the fully-closed position. In one or more embodiments, one or more of the components or elements shown in FIGS. 4A and 4B may be omitted, repeated, and/or substituted. Accordingly, embodiments of a frame of an electrical connector should not be considered limited to the specific configuration shown in FIGS. 4A and 4B.

Referring to FIGS. 1A-4B, in certain example embodiments, the electrical connector 400 includes a housing. The housing can include a top 482 (sometimes called a gland nut) and a bottom 483 (sometimes called a plug body) that are moveably (e.g., rotatably, threadably) coupled to each other. When the top 482 and the bottom 483 are fully coupled to each other, the electrical connector can be said to be in a fully-closed position. When the top 482 and the bottom 483 are not fully coupled to each other, the electrical connector can be said to be in some other position (e.g., an open position, a partially-closed position). Both the top 482 and the bottom 483 of the electrical connector 400 can have a passage 475 (partially hidden from view in FIGS. 4A and 4B by the cable 402) that traverses the height of the top 482 and the height of the bottom 483.

When the top 482 and the bottom 483 of the electrical connector 400 are coupled to each other (whether fully coupled to each other or partially coupled to each other), the top 482 and the bottom 483 form a receiving area 488. In certain example embodiments, a universal bushing (e.g., universal bushing 200) is positioned inside of the receiving area 488. The passage 475 of the top 482 and the bottom 483 can also traverse the receiving area 488. In such a case, the passage 475 of the top 482 and the bottom 483 can traverse the receiving area 488 through the axial center of the top 482 and the bottom 483. The passage 475 can receive the cable 402, described below.

The top 482 of the electrical connector 400 can have one or more of a number of features. For example, the top 482 can include a body 406 and one or more coupling features 407 (e.g., mating threads, tabs, slots, detents) that allow the top 482 to be moveably coupled to the bottom 483. Similarly, the bottom 483 can include one or more coupling features 405 (e.g., mating threads, tabs, slots, detents) that are complementary to the coupling features 407 of the top 482. Thus, the top 482 and the bottom 483 can be coupled and decoupled from each other using the coupling features 407 of the top and the coupling features 405 of the bottom. When the top 482 and the bottom 483 are decoupled from each other, the universal bushing 200 can be removed and/or inserted into at least a portion of the receiving area 488. In such a case, one or more bushing members of the universal bushing 200 can be inserted and/or removed based, at least in part, on the size of the cable 402.

Another feature of the top 482 can include a compression feature 401. In such a case, the compression feature 401 has a shape and/or contour that complements the shape and/or contour of the top portion 212 of the base member 210. For example, if the top portion 212 of the base member 210 is flat, then the compression feature 401 can be a flat, slanted wall. The compression feature 401 can be substantially parallel to the top portion 212 of the base member 210 of the universal bushing 200 when the universal bushing 200 is positioned within the receiving area 488. As the top 482 and the bottom 483 of the electrical connector 400 are moved to the fully-closed position, the compression feature 401 of the top 482 contacts the top portion 212 of the base member 210. Because the top portion 212 of the base member 210 is tapered, the compression feature 401 can apply a compressive force to the top portion 212.

In other words, as the top 482 and the bottom 483 of the electrical connector 400 are moved to the fully-closed position, the compression feature 401 applies an inward force to the top portion 212 of the base member 210, which in turn applies an inward force to the bushing members (e.g. bushing member 220, bushing member 230, bushing member 240, bushing member 250). Consequently, the compressive force applied by the compression feature 401 forces the inner-most bushing member (in this case, bushing member 250) to form a liquid-tight seal around the cable 402 at area 497.

In certain example embodiments, conical washer 408 and/or some other feature can be disposed between a compression feature (e.g., compression feature 401) of the electrical connector 400 and the base member 210. For example, as shown in FIGS. 4A and 4B, a conical washer 408 can be disposed between the compression feature 401 of the top 482 and the top portion 212 of the base member 210. The conical washer 408 can be used to more effectively transfer the compressive force generated by the electrical connector 400 to the base member 210. Specifically, in this example, the conical washer 408 can be used to reduce friction between the compression feature 401 of the top 482 and the top portion 212 of the base member 210, which allows a user to more easily tighten and/or loosen the top 482 of the electrical connector 400 relative to the bottom 483 of the electrical connector 400.

In addition, or in the alternative, the bottom 483 of the electrical connector 400 can include a body 404 with a similar compression feature 409. In certain example embodiments, the compression feature 409 has a shape and/or contour that complements the shape and/or contour of the bottom portion 214 of the base member 210. For example, as shown in FIGS. 4A and 4B, if the bottom portion 214 of the base member 210 is flat, then the compression feature 409 can be a flat, slanted wall. The compression feature 409 can be substantially parallel to the bottom portion 214 of the base member 210 of the universal bushing 200 when the universal bushing 200 is positioned within the receiving area 488. As the top 482 and the bottom 483 of the electrical connector 400 are moved to the fully-closed position, the compression feature 409 of the bottom 483 contacts the bottom portion 214 of the base member 210. Because the bottom portion 214 of the base member 210 is tapered, the compression feature 409 can apply a compressive force to the bottom portion 214.

In other words, as the top 482 and the bottom 483 of the electrical connector 400 are moved to the fully-closed position, the compression feature 409 applies an inward force to the bottom portion 214 of the base member 210, which in turn applies an inward force to the bushing members (e.g. bushing member 220, bushing member 230, bushing member 240, bushing member 250). Consequently, the compressive force applied by the compression feature 409 can force the inner-most bushing member (in this case, bushing member 250) to form a liquid-tight seal around the cable 402 at area 497.

In certain example embodiments, a liquid-tight seal is maintained between the compression feature 409 and the bottom portion 214 of the base member 210. Such a liquid-tight seal can complement the liquid-tight seal between the cable 402 and the universal bushing 200 at area 497. In such a case, there may be no conical washer 408 or similar device disposed between the compression feature 409 and the bottom portion 214. As a result, a high amount of friction can exist between the compression feature 409 and the bottom portion 214. Such high friction can make coupling/decoupling the top 482 and the bottom 483 more difficult for a user. To reduce the friction between the compression feature 409 and the bottom portion 214, a material (e.g. talc) can be applied to the mating surface between the compression feature 409 and the bottom portion 214. In addition, or in the alternative, the bottom portion 214 of the base member 210 can be curved or chamfered, as shown in FIG. 5 below.

Because the various components (e.g., bushing members, base member) of the universal bushing 200 are made of an elastomeric material, such components can be deformed into a different position than when such components are in a natural state. For example, when the compressive force causes the inner-most bushing member 250 to form a liquid-tight seal around the cable 402 at area 497, a gap 490 can form above the area 497 and/or a gap 491 can form below the area 497. Further, the receiving area 488 can accommodate any deformity of the base member 210 when the base member 210 is under compression from the compression feature 401 and/or the compression feature 409. Similarly, space in the passage 475 that is not occupied by the cable 402 can accommodate any deformity of the bushing members when the bushing members are under compression from the compression feature 401 and/or the compression feature 409. Thus, the perimeter of the passage 475 can be greater than the perimeter of the cable 402 and the inner perimeter of the inner surface of the inner-most bushing member (in this case, the inner perimeter of the inner surface 256 of the bushing member 250).

As discussed above, the various components of the universal bushing can be added and/or removed at different times over its use. For example, in FIGS. 4A and 4B, four bushing members (bushing member 220, bushing member 230, bushing member 240, and bushing member 250) are used so that the inner perimeter of the bushing member 250 is approximately the same as, or slightly larger than, the perimeter of the cable 402. If the cable 402 is replaced with a cable having a larger perimeter, one or more of the bushing members of the universal bushing 200 can be removed so that the inner perimeter of the inner-most bushing member is approximately the same as, or slightly larger than, the perimeter of the new cable. Similarly, if the cable 402 is replaced with a cable having a smaller perimeter, one or more of the bushing members of the universal bushing 200 can be added so that the inner perimeter of the inner-most bushing member is approximately the same as, or slightly larger than, the perimeter of the new cable.

Figure 5:
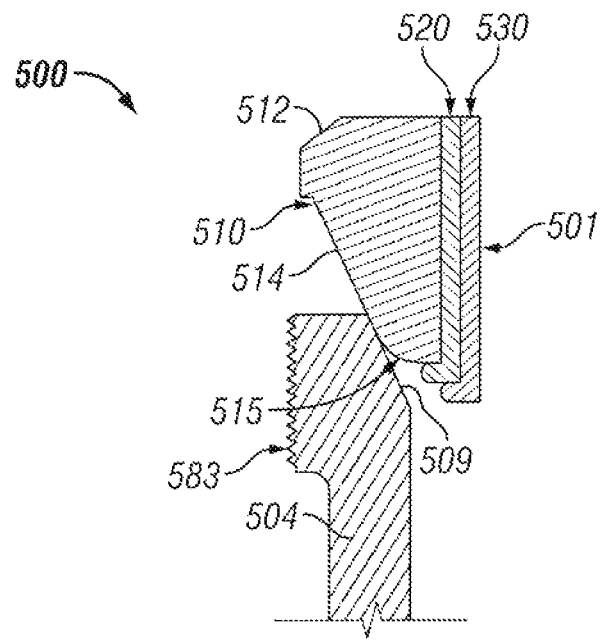
FIG. 5 shows a detailed view of a portion of an electrical connector in accordance with certain example embodiments.

FIG. 5 shows a detailed view of a portion of an electrical connector 500 in accordance with certain example embodiments. In one or more embodiments, one or more of the components or elements shown in FIG. 5 may be omitted, repeated, and/or substituted. Accordingly, embodiments of an electrical connector should not be considered limited to the specific configuration shown in FIG. 5.

Referring to FIGS. 1A-5, the portion of the electrical connector 500 includes a universal bushing 501. The electrical connector 500 is substantially similar to the electrical connector 400 of FIGS. 4A and 4B. The bottom 583 of the electrical connector 500 is shown in FIG. 5. The universal bushing 501 of FIG. 5 is substantially similar to the universal bushing 200 of FIGS. 2A and 2B, except that the universal bushing 501 does not include a handling feature and has only two bushing members (bushing member 520 and bushing member 530).

In this case, the bottom part of the bottom portion 514 of the base member 510 has a chamfered or rounded corner 515, which helps reduce friction between the bottom portion 514 and the compression feature 509 of the body 504 of the bottom 583 of the electrical connector 500 when the top (not shown) and the bottom 583 are coupled to and/or decoupled from each other. At the same time, the chamfered or rounded corner 515 may not reduce or eliminate the liquid-tight seal formed between the bottom portion 514 and the compression feature 509.

Figure 6:
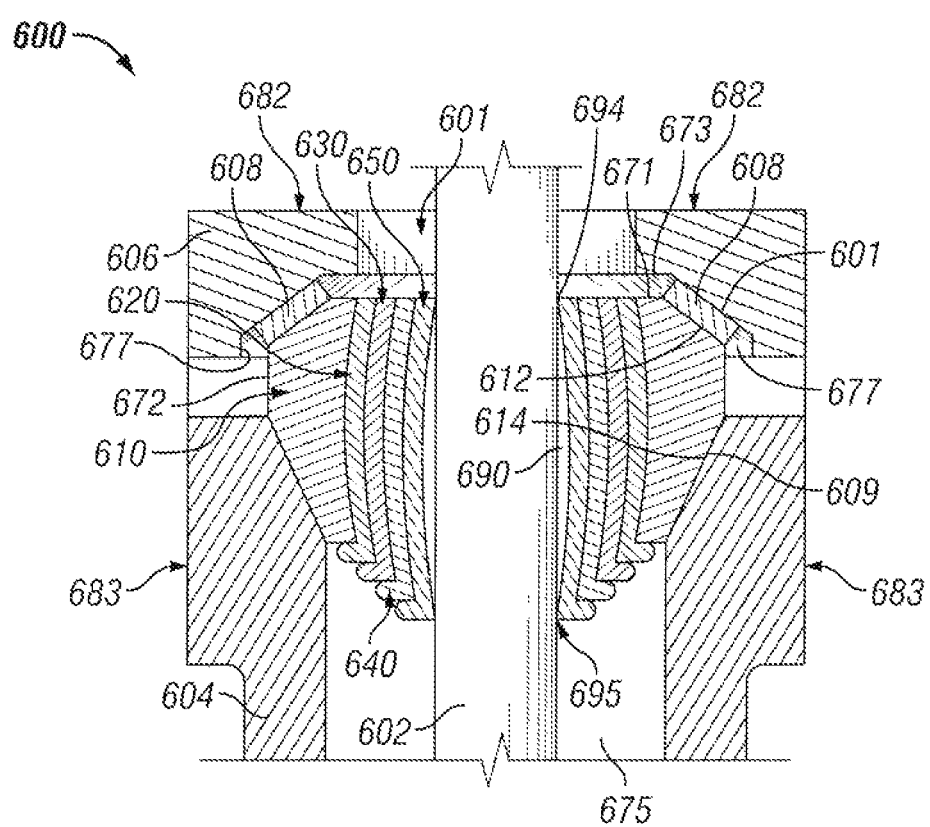
FIG. 6 shows a cross-sectional side view of an electrical connector that includes another example universal bushing in accordance with certain example embodiments.

FIG. 6 shows a cross-sectional side view of an electrical connector 600 that includes another example universal bushing 601 in accordance with certain example embodiments. Specifically, the electrical connector 600 of FIG. 6 is substantially similar to the electrical connector 400 of FIG. 4B, with the exceptions noted below. Elements shown in FIG. 6 that are not specifically discussed below can be assumed to be substantially similar to the corresponding elements in FIG. 4B. For example, the conical washer 608 of FIG. 6 can be assumed to be substantially similar to the conical washer 408 of FIG. 4B discussed above.

Referring to FIGS. 1A-6, only a portion of the body 606 of the top 682 and a portion of the body 604 of the bottom 683 of the electrical connector 600 is shown. For example, the electrical connector 600 of FIG. 6 does not show how the top 682 and the bottom 683 of the electrical connector 600 are coupled to each other. In FIG. 6, the part of the body 606 of the top 682 that applies a compressive force to the top portion 612 of the base member 610 is shaped, in addition to the compression feature 601, to include a compression feature 673 that is contoured to the shape of the top 671 of the base member 610 and a compression feature 677 that is contoured to the shape of the side 672 of the base member 610 and a compression feature.

When such a configuration of the body 606 of the top 682 is used, in combination with the tapered angle of the top portion 612, the compressive force can cause different portions of the inner surface of the inner-most bushing member (in this case, bushing member 650) to contact the cable 602, forming a liquid-tight seal. For example, as shown in FIG. 6, the compressive force applied by the top 682 to the universal bushing 601 forces the inner surface of bushing member 650 to contact the cable 602 at area 694, which is toward the top end, rather than the middle, of the inner surface of bushing member 650.

Similarly, the body 604 of the bottom 683 can be shaped and/or contoured in such a way that, when combined with the tapered angle of the bottom portion 614 of the base member 610, causes the inner surface of the inner-most bushing member (in this case, bushing member 650) to contact the cable 602 at a different point (e.g., away from the center) along the inner surface when the compressive force applied by the bottom 683. In this example, the inner surface of the bushing member 650 contacts the cable 602 at area 695, toward the bottom of the inner surface of the bushing member 650. The resulting contact between the inner surface of the bushing member 650 and the cable 602 at area 695 can form a liquid-tight seal. As a result, a gap 690 can exist between area 694 and area 695 between the cable 602 and the inner surface of the bushing member 650.

In certain example embodiments, the universal bushing 601 (and, more specifically, the base member 610) has a substantially symmetrical shape when comparing the top portion 612 and the bottom portion 614 of the base member 610. In such a case, the tapered angle of the top portion 612 and the tapered angle of the bottom portion 614 can be substantially equal. Similarly, the portions (e.g., the top 682, the bottom 683) of the electrical connector 600 that apply a compressive force to the universal bushing 601 can be modified accordingly so that the compressive force is effectively applied to the top portion 612 and the bottom portion 614 based on their respective tapered angles. When the tapered angle is less than 45°, less axial force can be required (resulting in more radial compression), which in turn can increase the area 694 and the area 695 and reduce the gap 690.

In certain example embodiments, the conical washer 608 can be eliminated if the top 682 and the bottom 683 of the electrical connector 600 are coupled to each other by some means other than rotational. In such a case, the consideration of overcoming friction to allow the top 682 and the bottom 683 to mechanically couple to each other is reduced or eliminated. For example, if the top 682 and the bottom 683 each had a flange through which one or more fastening devices (e.g., bolts) traverse to couple the top 682 and the bottom 683, then the conical washer 608 can be eliminated. As another example, if the top 682 and the bottom 683 formed a type of "joint nut" that allowed the top 682 and the bottom 683 to mechanically couple to each other, then the conical washer 608 can be eliminated.

Figure 7:
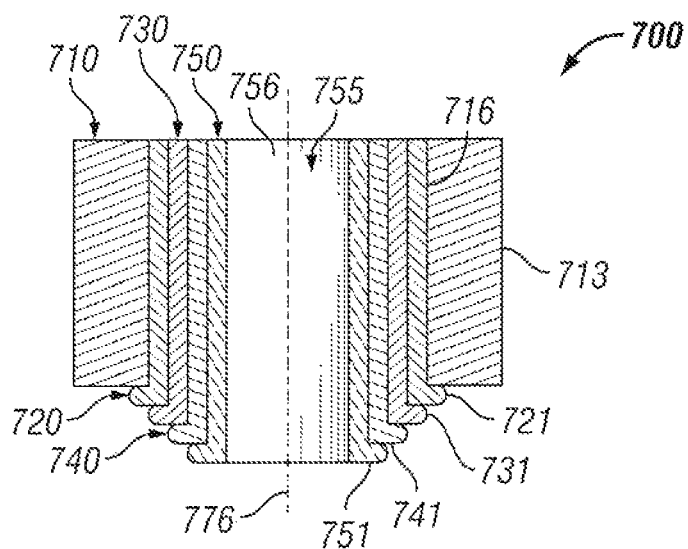
FIG. 7 shows a cross-sectional side view of another example universal bushing in accordance with certain example embodiments.

FIG. 7 shows a cross-sectional side view of another example universal bushing 700 in accordance with certain example embodiments. Specifically, the universal bushing 700 of FIG. 7 is substantially similar to the universal bushing 200 of FIGS. 2A and 2B, with the exceptions noted below. Elements shown in FIG. 7 that are not specifically discussed below can be assumed to be substantially similar to the corresponding elements in FIGS. 2A and 2B. For example, the inner surface 756 of the bushing member 750 of FIG. 7 can be assumed to be substantially similar to the inner surface 256 of the bushing member 250 of FIGS. 2A and 2B discussed above.

Figure 8A:
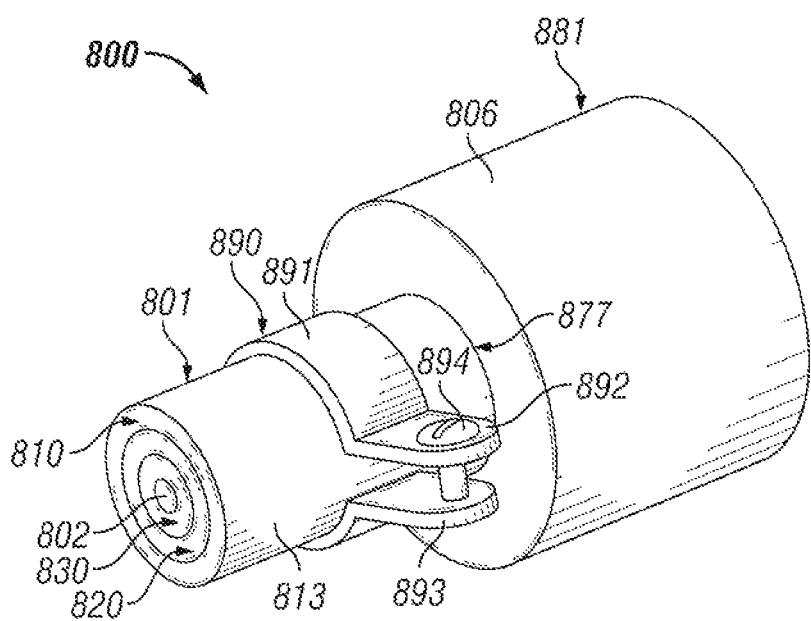
FIGS. 8A-8C shows various views of a portion of another electrical connector that includes an example universal bushing similar to that in FIGS. 1A and 1B in accordance with certain example embodiments.
Figure 8B:
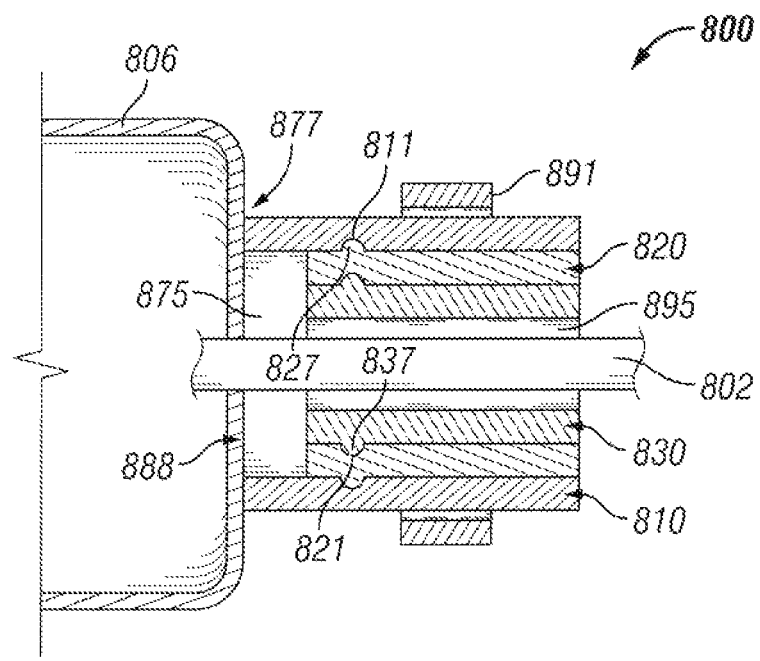
Figure 8C:
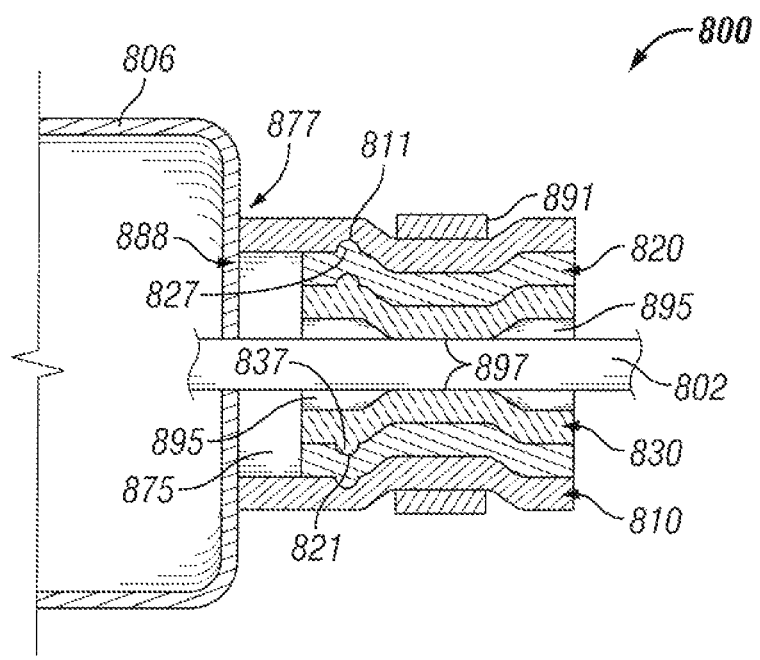

Referring to FIGS. 1A-7, the bushing members (e.g., bushing member 710, bushing member 720) of FIG. 7 may not include a handling feature. In addition, the base member 710 of the universal bushing 700 has a different shape and/or different features than the base member 210 of FIGS. 2A and 2B. Specifically, the base member 210 has a single outer portion 713 rather than a top portion and a bottom portion, where the outer portion 713 is not tapered. In other words, the base member 710 is not conically-shaped. As such, a compressive force applied to the outer portion 713 in this case is applied substantially directly inward, in a direction perpendicular to the lateral axis 776 that extends through the cavity 755 of the bushing member 750. FIGS. 8A-8C below show an example of an electrical connector that includes a universal bushing with a base member substantially similar to the base member 710 of FIG. 7.

FIGS. 8A-8C shows various views of a portion of another electrical connector 800 that includes an example universal bushing 801 in accordance with certain example embodiments. The universal bushing 801 of FIGS. 8A-8C is substantially similar to the universal bushing 100 of FIGS. 1A and 1B, except for the base member 810. In addition, the universal bushing 800 of FIGS. 8A-8C include only two, not four, bushing members (bushing member 820 and bushing member 830). Elements of the universal bushing 801 shown in FIGS. 8A-8C that are not specifically discussed below can be assumed to be substantially similar to the corresponding elements of the universal bushing 100 in FIGS. 1A and 1B. For example, the recess 811 of the base member 810 of FIGS. 8A-8C can be assumed to be substantially similar to the recess 111 of the base member 110 of FIGS. 1A and 1B discussed above. The base member 810 of the universal bushing 801 of FIGS. 8A-8C is substantially similar to the base member 710 of the universal bushing 700 of FIG. 7 above.

The electrical connector 800 of FIGS. 8A-8C has several differences from the electrical connectors discussed above. For example, the housing of the electrical connector 800 does not include a top and a bottom, but rather has an elongated body 806. The elongated body 806 has, disposed on its distal end, a receiving area 888. The receiving area 888 receives the universal bushing 801 so that the universal bushing 801 mechanically couples to the body 806 of the housing of the electrical connector 800.

The universal bushing 801 can be coupled to the body 806 in one or more of a number of ways, including but not limited to fixedly, removeably, threadably, slidably, and detachably. The universal bushing 801 can be coupled to the body 806 using one or more of a number of coupling methods, including but not limited to epoxy, mating threads, vulcanization, compression fittings, clamping, and sealant. In certain example embodiments, the coupling between the universal bushing 801 and the body 806 is sealed such that little or no liquids can pass through the coupling.

Further, in certain example embodiments, only the base member 810 of the universal bushing 801 is coupled to the body 806. In such a case, if the base member 810 is fixedly coupled to the body 806, bushing members of the universal bushing 801 can be added and/or removed to accommodate a cable of a specific size. The length (height) of the bushing members (bushing member 820, bushing member 830) can be shorter (as shown in FIGS. 8B and 8C), the same length as, or longer than the base member 810.

To secure the inner surface of the inner-most bushing member (in this case, bushing member 830) to the cable 802, the electrical connector 800 of FIGS. 8A-8C includes a securing mechanism 890 that can be disposed around the outer portion 813 of the base member 810. The securing mechanism 890 can be any type of device or feature of the electrical connector 800 that applies a compressive force to at least a portion of the universal bushing 801.

For example, the securing mechanism 890 can be a clamp, as shown in FIGS. 8A-8C. In such a case, the securing mechanism 890 can include a ring-shaped body 891 with a securing end 892 disposed at one end of the body 891 and a securing end 893 disposed at the other end of the body 891. The features (e.g. size, shape, thickness) of the securing end 892 and the corresponding features of the securing end 893 can be substantially the same and/or different from each other. The body 891 can have any shape, size, thickness, and/or other features suitable for the electrical connector 800.

The securing end 892 and the securing end 893 can include one or more fastening features that allow the securing end 892 and the securing end 893 to mechanically couple to each other. Examples of such fastening features can include, but are not limited to, a fastening device (e.g., a screw (as shown in FIG. 8A), a bolt), a clamp, a slot, a tab, a latch, and a locking feature. When the securing end 892 and the securing end 893 are mechanically coupled to each other, the body 891 can be compressed, causing the body 891 to exert an inward (compressive) force. Consequently, when the securing mechanism 890 is disposed around the outer portion 813 of the base member 810 of the universal bushing 801, the securing mechanism 890 applies a compressive force to the universal bushing 801.

When a cable 802 is disposed within the universal bushing 801, the inner surface of the inner-most bushing member (in this case, bushing member 830) makes contact with the cable 802 and can create a liquid-tight seal in area 897. Since the compressive force exerted by the securing mechanism 890 is not applied across the entire outer portion 813 of the base member 810, a gap 895 can exist between the inner surface of the bushing member 830 and the cable 802 on either side of the area 897.

In certain example embodiments, the inner perimeter of the inner-most bushing member is slightly smaller than the perimeter of the cable. In such a case, because the inner-most bushing member is made of elastomeric material, the cable can fill slide through and be positioned within the universal bushing. Thus, some friction functionality between the cable and the universal bushing is acceptable.

Example embodiments described herein provide for a universal bushing. Specifically, example embodiments are directed to a bushing that can be adjusted to larger and/or smaller cables. When the electrical connector (or any other device with which an example universal bushing can be used) is decoupled, a user can access the universal bushing. The size of the universal bushing can be adjusted for a given cable size by adding and/or removing bushing members.

When the electrical connector is coupled and tightened into a fully-closed position, the electrical connector applies one or more compressive forces on the universal bushing. Since the example universal bushing is made of an elastomeric material, the universal bushing becomes deformed under the compressive force(s). As a result, the inner-most bushing member can form a liquid-tight seal against the cable when the electrical connector is tightened into the fully-closed position. The electrical connector can include one or more compression features that can correspond to one or more tapered portions of the base member of the example universal bushing. Such compression features can apply a compressive force to the universal bushing, which causes the universal bushing to become deformed. The electrical connector can also have one or more areas (e.g., receiving area, passage) that provide space for the universal bushing when the universal bushing is deformed under compression.

The accessibility of the universal bushing and the ability to increase and/or decrease the size of the universal bushing using the detachable/attachable bushing members allow for reusability, as well as easy maintenance and installation of cables and/or associated equipment. Thus, time, costs, and material can be saved using example embodiments described herein.

Although the embodiments herein are described with reference to preferred and/or example embodiments, it should be appreciated by those skilled in the art that various modifications are well within the scope and spirit of this disclosure. From the foregoing, it will be appreciated that embodiments herein overcome the limitations of the prior art. Those skilled in the art will appreciate that the example embodiments are not limited to any specifically discussed application and that the embodiments described herein are illustrative and not restrictive. From the description of the example embodiments, equivalents of the elements shown therein will suggest themselves to those skilled in the art, and ways of constructing other embodiments will suggest themselves to practitioners of the art. Therefore, the scope of the example embodiments is not limited herein.

What is claimed is:

1. A universal bushing, comprising:
a base member comprising at least one outer portion and at least one inner wall that forms a first cavity, wherein the at least one inner wall has a perimeter that is substantially uniform along a first height of the at least one inner wall; and
a first bushing member removeably coupled to the base member and disposed within the first cavity, wherein the first bushing member comprises at least one first wall having a first inner surface that forms a second cavity and a first outer surface, wherein the at least one first wall has a first inner perimeter that is substantially uniform along a second height of the at least one first wall, and wherein the first outer surface forms a first outer perimeter,
wherein the first inner perimeter is less than the perimeter and the first outer perimeter,
wherein the first outer perimeter is slightly less than the perimeter,
wherein the first bushing member, once decoupled from the base member, is configured to recouple to the base member,
wherein the base member and the first bushing member are made of an elastomeric material,
wherein the first bushing member further comprises a first collar positioned at a first bottom end of the first bushing member and extending radially outward from the at least one first wall, and
wherein the first bushing member further comprises a first handling feature that extends laterally from a distal end of the first collar, wherein the first handling feature has a smooth inner surface and a smooth outer surface.

2. The universal bushing of claim 1, further comprising:
a second bushing member removeably coupled to the first bushing member and disposed within the second cavity, wherein the second bushing member comprises at least one second wall having a second inner surface that forms a third cavity and a second outer surface, wherein the at least one second wall has a second inner perimeter that is substantially uniform along a third height of the at least one second wall, and wherein the second outer surface forms a second outer perimeter,
wherein the second inner perimeter is less than the second outer perimeter,
wherein the second outer perimeter is slightly less than the first inner perimeter,
wherein the second bushing member, once decoupled from the first bushing member, is configured to recouple to the first bushing member, and
wherein the second bushing member is made of the elastomeric material.

3. The universal bushing of claim 2, wherein the first height is less than the second height, and wherein the second height is less than the third height.

4. The universal bushing of claim 3, wherein the first collar has a first thickness that is substantially a first difference between the second height and the first height.

5. The universal bushing of claim 4, wherein the second bushing member further comprises a second collar positioned at a second bottom end of the second bushing member and extending radially outward from the at least one second wall, wherein the second bushing member further comprises a second handling feature that extends laterally from a distal end of the second collar, wherein the second handling feature has a smooth inner surface and a smooth outer surface, wherein the second collar has a second thickness that is substantially a second difference between the third height and the second height.

6. The universal bushing of claim 5, wherein the second handling feature extends beyond the first handling feature.

7. The universal bushing of claim 5, wherein the base member is conically shaped, wherein the at least one outer portion of the base member comprises a tapered top and a tapered bottom.

8. An electrical connector, comprising:
a housing comprising a receiving area and a passage that traverses the receiving area; and
a universal bushing positioned within the receiving area, wherein the universal bushing comprises:
a base member comprising at least one outer portion and at least one inner wall that forms a first cavity, wherein the at least one inner wall has a perimeter that is substantially uniform along a first height of the at least one inner wall; and
a first bushing member removeably coupled to the base member and disposed within the first cavity, wherein the first bushing member comprises at least one first wall having a first inner surface that forms a second cavity and a first outer surface, wherein the at least one first wall has a first inner perimeter that is substantially uniform along a second height of the at least one first wall, and wherein the first outer surface forms a first outer perimeter,
wherein the first inner perimeter is less than the perimeter and the first outer perimeter,
wherein the first outer perimeter is slightly less than the perimeter,
wherein the first bushing member, once decoupled from the base member, is configured to recouple to the base member,
wherein the base member and the first bushing member are made of an elastomeric material,
wherein the first bushing member further comprises a first collar positioned at a first bottom end of the first bushing member and extending radially outward from the at least one first wall, and
wherein the first bushing member further comprises a first handling feature that extends laterally from a distal end of the first collar, wherein the first handling feature has a smooth inner surface and a smooth outer surface.

9. The electrical connector of claim 8, further comprising:
a cable disposed within the passage and the second cavity, wherein the cable has an outer cable perimeter that is substantially the same as the first inner perimeter.

10. The electrical connector of claim 8, wherein the universal bushing further comprises:

a second bushing member removeably coupled to the first bushing member and disposed within the second cavity, wherein the second bushing member comprises at least one second wall having a second inner surface that forms a third cavity and a second outer surface, wherein the at least one second wall has a second inner perimeter that is substantially uniform along a third height of the at least one second wall, and wherein the second outer surface forms a second outer perimeter, wherein the second inner perimeter is less than the second outer perimeter, wherein the second outer perimeter is slightly less than the first inner perimeter, wherein the second bushing member, once decoupled from the first bushing member, is configured to recouple to the first bushing member, wherein the second bushing member is made of the elastomeric material.

11. The electrical connector of claim 10, further comprising:

a cable disposed within the passage and the third cavity, wherein the cable has an outer cable perimeter that is substantially the same as the second inner perimeter.

12. The electrical connector of claim 8, wherein the housing further comprises a top and a bottom that are moveably coupled to each other, wherein the top and the bottom, when coupled to each other, form the receiving area, and wherein the passage traverses the receiving area, the top, and the bottom.

13. The electrical connector of claim 12, wherein the universal bushing is removable when the top and the bottom of the housing are mechanically decoupled from each other.

14. The electrical connector of claim 12, wherein the universal bushing forms a liquid-tight seal around the cable when the top and the bottom of the housing are mechanically coupled to each other.

15. The electrical connector of claim 14, wherein the bottom of the housing comprises a first compression feature that contacts a bottom portion of the base member of the universal bushing when the universal bushing is positioned within the receiving area, wherein the first compression feature applies a first compressive force to the bottom portion of the base member when the top and the bottom of the housing are mechanically coupled to each other.

16. The electrical connector of claim 15, wherein the bottom portion of the base member is tapered at an angle of that is less than 90° relative to a lateral axis that extends through the first cavity.

17. The electrical connector of claim 14, wherein the top of the housing comprises a second compression feature that contacts a top portion of the base member of the universal bushing when the universal bushing is positioned within the receiving area, wherein the second compression feature applies a second compressive force to the top portion of the base member when the top and the bottom of the housing are mechanically coupled to each other.

18. The electrical connector of claim 17, wherein the top portion of the base member is tapered at an angle of that is greater than 90° relative to a lateral axis that extends through the first cavity.

19. The electrical connector of claim 10, wherein the second bushing member further comprises a second collar positioned at a second bottom end of the second bushing member and extending radially outward from the at least one second wall, wherein the second bushing member further comprises a second handling feature that extends laterally from a distal end of the second collar, wherein the second handling feature has a smooth inner surface and a smooth outer surface, wherein the second collar has a second thickness that is substantially a second difference between the third height and the second height.

* * * * *